US012602079B2

(12) United States Patent     (10) Patent No.:   US 12,602,079 B2

Usuginu et al.     (45) Date of Patent:    Apr. 14, 2026

(54) ELECTRONIC DEVICE

(71) Applicant: Panasonic Intellectual Property Management Co., Ltd., Osaka (JP)

(72) Inventors: Yutaro Usuginu, Osaka (JP); Noriyuki Maki, Osaka (JP); Munehiro Torii, Osaka (JP); Shogo Mikami, Miyagi (JP); Kazuhiro Takeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 91 days.

(21) Appl. No.: 18/667,106

(22) Filed: May 17, 2024

(65) Prior Publication Data

US 2024/0302862 A1    Sep. 12, 2024

Related U.S. Application Data

(63) Continuation of application No. PCT/JP2022/039853, filed on Oct. 26, 2022.

(30) Foreign Application Priority Data

Dec. 8, 2021    (JP) ................................. 2021-199525

(51) Int. Cl.
    *G06F 1/16*        (2006.01)
(52) U.S. Cl.
    CPC .......... *G06F 1/1635* (2013.01); *G06F 1/1632* (2013.01); *G06F 1/1656* (2013.01); *G06F 1/1677* (2013.01)
(58) Field of Classification Search
    CPC ................................ G06F 1/1635; G06F 1/187
    See application file for complete search history.

(56) References Cited

U.S. PATENT DOCUMENTS

| | | | | |
|---|---|---|---|---|
| 5,255,965 | A | * | 10/1993 | Chen ...................... E05D 11/105 |
| | | | | 16/334 |
| 5,278,730 | A | * | 1/1994 | Kikinis ................. G06F 1/1656 |
| | | | | 361/679.55 |
| 5,331,506 | A | * | 7/1994 | Nakajima ............. G06F 1/1635 |
| | | | | 361/679.58 |
| 5,473,506 | A | * | 12/1995 | Kikinis ................ H05K 5/0291 |
| | | | | 361/688 |
| 5,574,625 | A | * | 11/1996 | Ohgami ............... G06F 1/1643 |
| | | | | 439/142 |
| 5,583,744 | A | * | 12/1996 | Oguchi ................... G06F 1/166 |
| | | | | 429/98 |

(Continued)

FOREIGN PATENT DOCUMENTS

| | | | |
|---|---|---|---|
| JP | H03-244013 A | 10/1991 |
| JP | H04-000629 A | 1/1992 |

(Continued)

OTHER PUBLICATIONS

International Search Report for corresponding Application No. PCT/JP2022/039853, mailed Dec. 20, 2022.

*Primary Examiner* — Adrian S Wilson

(74) *Attorney, Agent, or Firm* — Renner, Otto, Boisselle & Sklar, LLP

(57)        ABSTRACT

An electronic device of the present disclosure includes a battery storage that stores a battery, and a housing provided with the battery storage. The battery storage is configured such that a module that reads or writes data of a storage medium can be attached.

9 Claims, 11 Drawing Sheets

(56)                    References Cited

U.S. PATENT DOCUMENTS

| | | | | | |
|---|---|---|---|---|---|
| 5,861,873 | A * | 1/1999 | Kikinis | ................... | G06F 1/169 |
| | | | | | 345/157 |
| 6,351,375 | B1 * | 2/2002 | Hsieh | ...................... | G06F 1/184 |
| | | | | | 361/679.33 |
| 6,574,097 | B2 * | 6/2003 | Hood, III | .............. | G06F 1/1616 |
| | | | | | 248/581 |
| 6,967,832 | B2 * | 11/2005 | Mariano | ................. | G06F 1/181 |
| | | | | | 369/75.11 |
| 7,123,487 | B2 * | 10/2006 | Saito | ................. | G06K 13/0875 |
| | | | | | 361/801 |
| 7,251,132 | B1 * | 7/2007 | Paul | ....................... | G06F 1/187 |
| | | | | | 248/618 |
| 8,454,101 | B2 * | 6/2013 | Kuo | ..................... | A45C 13/008 |
| | | | | | 220/377 |
| 9,128,675 | B2 * | 9/2015 | Iwamoto | ............... | G06F 1/1656 |
| 9,668,370 | B1 * | 5/2017 | Huang | ................ | H05K 5/0217 |
| 10,165,700 | B1 * | 12/2018 | Sanders | ................ | G06F 1/1632 |
| 10,820,415 | B1 * | 10/2020 | Stenfort | ................ | G06F 13/385 |
| 2007/0121284 | A1 | 5/2007 | Iida et al. | | |
| 2009/0256364 | A1 * | 10/2009 | Gadau | ................... | G06F 1/1616 |
| | | | | | 361/679.55 |
| 2010/0259879 | A1 | 10/2010 | Watanabe | | |
| 2011/0267761 | A1 * | 11/2011 | Peng | ................... | G11B 33/128 |
| | | | | | 361/679.31 |
| 2013/0013942 | A1 | 1/2013 | Koshimizu | | |
| 2019/0053392 | A1 * | 2/2019 | Xu | ....................... | G11B 33/124 |
| 2022/0091638 | A1 * | 3/2022 | Lee | ......................... | E05C 19/10 |

FOREIGN PATENT DOCUMENTS

| | | |
|---|---|---|
| JP | H05-053690 A | 3/1993 |
| JP | H08-234880 A | 9/1996 |
| JP | 2007-115091 A | 5/2007 |
| JP | 2010-250514 A | 11/2010 |
| JP | 2013-037673 A | 2/2013 |
| JP | 2014-011480 A | 1/2014 |

* cited by examiner

ELECTRONIC DEVICE

TECHNICAL FIELD

The present disclosure relates to an electronic device.

BACKGROUND ART

Some electronic devices include a detachable component such as a battery or a memory card in a housing (see, for example, Patent Literature 1).

CITATION LIST

Patent Literature

PTL 1: Unexamined Japanese Patent Publication No. 2007-115091

SUMMARY OF THE INVENTION

In recent years, electronic devices with improved usability have been required.

Therefore, an object of the present disclosure is to provide an electronic device that improves usability.

An electronic device according to the present disclosure includes a battery storage that stores a battery, and a housing provided with the battery storage. The battery storage is configured such that a module that reads or writes data of a storage medium can be attached.

An electronic device according to an exemplary embodiment of the present disclosure provides an electronic device that improves usability.

BRIEF DESCRIPTION OF THE DRAWINGS

FIG. 4 is a schematic enlarged view of the battery storage and a lid portion of the electronic device illustrated in FIG. 1.

FIG. 9A is a schematic perspective view illustrating an example of the card reader module stored in the battery storage of the electronic device illustrated in FIG. 1.

DESCRIPTION OF EMBODIMENT

Background of Present Disclosure

Figure 1:
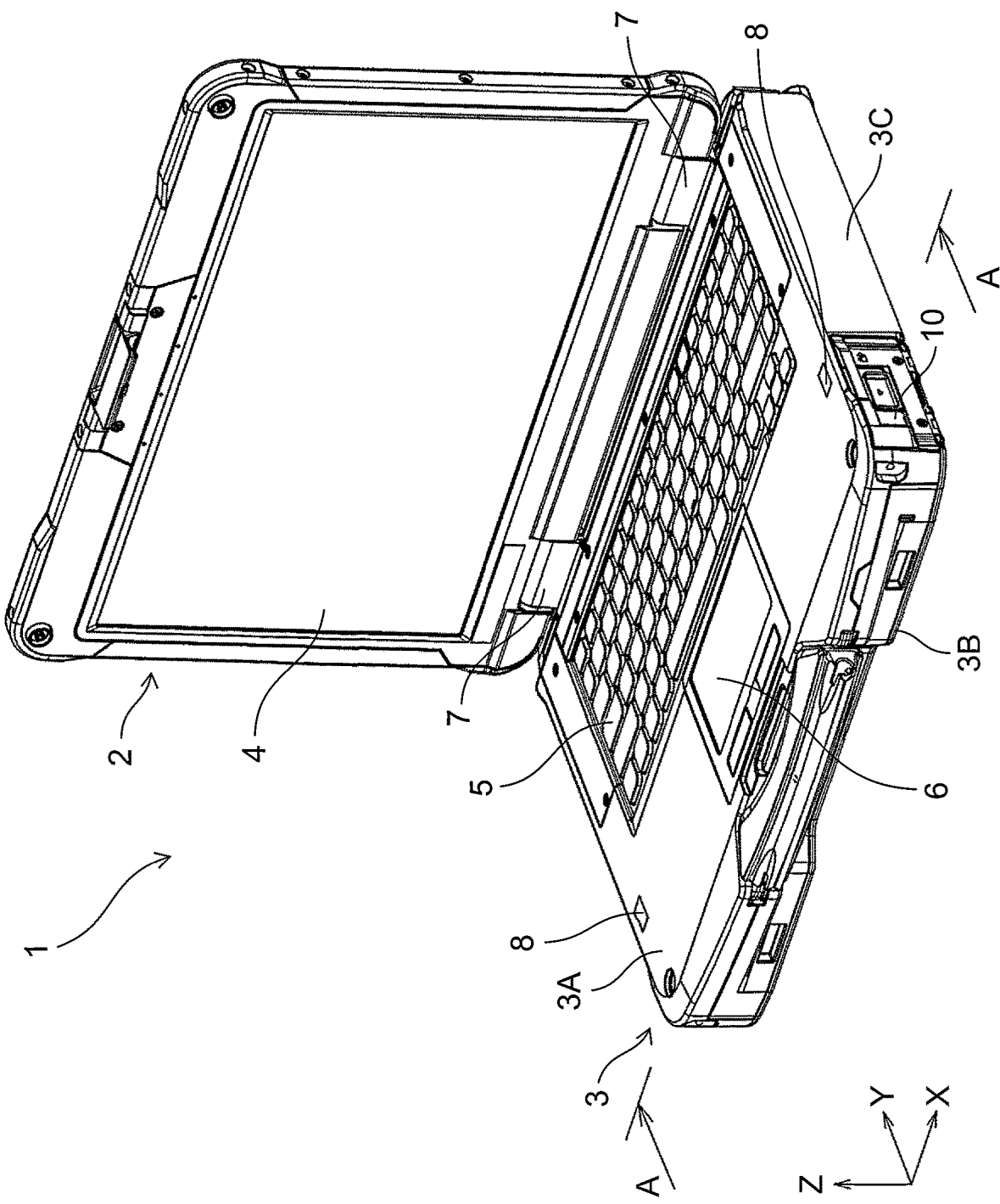
FIG. 1 is a schematic perspective view of an electronic device according to an exemplary embodiment of the present disclosure.

In recent years, electronic devices capable of using various modules have been required from the viewpoint of improving usability. For example, there is a demand for an electronic device that can use a module or the like that reads or writes data of a storage medium.

On the other hand, electronic devices are required to be downsized, and there is a limited space for mounting a module on the electronic device. Therefore, a configuration in which the module is attachable to and detachable from the electronic device is adopted. For example, a method of externally connecting a module to an electronic device with a connection cable such as a USB is adopted.

However, the external connection of the module has a problem from the viewpoint of portability and the like. Further, in an electronic device having waterproof and/or dust-proof properties, it is difficult to externally connect a module.

For these reasons, it is required to detachably store a module inside an electronic device in order to realize miniaturization of the electronic device and improve usability.

Therefore, the present inventor has found a configuration in which a module for reading or writing data of a storage medium can be attached to a battery storage that stores a battery, and has reached the present disclosure.

An electronic device according to a first aspect of the present disclosure includes a housing provided with a battery storage that stores a battery, and the battery storage is configured to be attachable to a module that reads or writes data of a storage medium.

With such a configuration, usability can be improved.

In an electronic device according to the second aspect of the present disclosure, the battery storage may be provided with a component attachment and detachment opening through which the battery and the module are attached and detached, the electronic device may include a lid portion that opens and closes the component attachment and detachment opening, and a mechanical switch that detects an open or closed state of the lid portion, and the storage medium may be a magnetic storage medium.

With such a configuration, since the open or close state of the lid portion is detected by the mechanical switch, data can be safely read or written without being magnetically affected by the mechanism that detects the open or close state of the lid portion.

In an electronic device according to a third aspect of the present disclosure, the mechanical switch may include: a slide member slidably disposed in the battery storage; a lever disposed around the slide member in a direction intersecting a sliding direction of the slide member; and a protrusion provided on the lid portion, and when the lid portion is closed, the slide member may slide and move by coming into contact with the protrusion and come into contact with the lever.

With such a configuration, the slide range (stroke length) of the slide member becomes long, and the slide member and the lever reliably come into contact with each other.

An electronic device according to a fourth aspect of the present disclosure may further include: a peripheral wall that defines the component attachment and detachment opening; and a seal member provided on the lid portion, and the mechanical switch may be disposed inside the peripheral wall, and when the lid portion is closed, the peripheral wall and the seal member may come into contact with each other to seal the component attachment and detachment opening.

With such a configuration, it is possible to prevent liquid such as water from flowing into the housing from the component attachment and detachment opening, and there is a waterproof effect on the mechanical switch.

In an electronic device according to a fifth aspect of the present disclosure, the lid portion may be disposed on a side surface of the housing, and the component attachment and detachment opening may be provided on a side surface of the housing.

With such a configuration, the battery or the module can be easily attached and detached.

In an electronic device according to a sixth aspect of the present disclosure, the battery storage may include: a first terminal connected to the battery; and a second terminal disposed at a position different from a position at which the first terminal is disposed and connected to the module.

With such a configuration, it is possible to prevent the battery from being connected to the second terminal, and prevent the module from being connected to the first terminal.

In an electronic device according to a seventh aspect of the present disclosure, the module may include a stopper, and the battery storage may include a recess into which the stopper is stored when the module is attached to the battery storage.

With such a configuration, the module can be fixed to the battery storage.

In an electronic device according to an eighth aspect of the present disclosure, the housing may include an indicator indicating possibility of attachment and detachment of the battery when the battery is stored in the battery storage, and the indicator may be disposed on a surface including an input interface among the surfaces of the housing.

With such a configuration, it is possible to easily confirm possibility of attachment and detachment of the battery stored in the battery storage. Further, with such a configuration, the user can easily check the indicator.

In an electronic device according to a ninth aspect of the present disclosure, the indicator may indicate possibility of attachment and detachment of the module when the module is attached to the battery storage.

With such a configuration, it is possible to easily confirm possibility of attachment and detachment of the module stored in the battery storage.

In an electronic device according to a tenth aspect of the present disclosure, the indicator may include an LED, and may indicate the possibility of attachment and detachment by a lighting state of the LED.

With such a configuration, the user can easily check the indicator.

Hereinafter, exemplary embodiments of the present disclosure will be described with reference to the accompanying drawings. In addition, in each drawing, each element is exaggerated in order to facilitate the description.

In this specification, the terms "first", "second", and the like are only used for description, and should not be understood as explicitly or implicitly indicating relative importance or a rank of a technical feature. Features limited to "first" and "second" are intended to explicitly or implicitly indicate the inclusion of one or more such features. In the accompanying drawings, X, Y, and Z directions in the drawings indicate a width direction, a depth direction, and a height direction of electronic device 1, respectively.

First Exemplary Embodiment (Overall Configuration of Electronic Device)

As illustrated in FIG. 1, electronic device 1 is a notebook personal computer (laptop PC). Electronic device 1 includes first housing 2 and second housing 3. Each of first housing 2 and second housing 3 has a thin box-shaped outer contour and has a rectangular shape.

As illustrated in FIG. 1, first housing 2 and second housing 3 are connected via first hinge portion 7. First hinge portion 7 rotatably connects first housing 2 and second housing 3. First hinge portion 7 allows first housing 2 and/or second housing 3 to rotate and brings electronic device 1 into an open state or a closed state. The "open state" means a state in which first housing 2 and second housing 3 are separated, and display 4 and input interfaces 5, 6 are exposed. The "closed state" means a state in which first housing 2 and second housing 3 are disposed to face each other, display 4 and input interfaces 5, 6 face each other, and display 4 and input interfaces 5, 6 are not exposed.

First housing 2 and second housing 3 are made of a metal material. For example, first housing 2 and second housing 3 are made of magnesium alloy.

(First Housing)

First housing 2 stores display 4. Display 4 is, for example, a liquid crystal. A display surface of display 4 is exposed from first housing 2. First housing 2 stores a camera, an antenna, and the like.

(Second Housing)

Second housing 3 stores input interfaces. The input interfaces are, for example, keyboard 5 and touch pad 6. The input interfaces are exposed from the surface of second housing 3. In the present specification, keyboard 5 and touch pad 6 may be referred to as input interfaces 5, 6. A circuit such as a CPU and a memory is stored inside second housing 3.

In the present specification, among the surfaces of second housing 3, a surface on which the input interface is exposed is also referred to as upper surface 3A of second housing 3. Among the surfaces of second housing 3, a surface opposite to upper surface 3A is also referred to as lower surface 3B of second housing 3. A surface connecting upper surface 3A and lower surface 3B is also referred to as side surface 3C of second housing 3. In side surface 3C of second housing 3, a side connected to first housing 2 is also referred to as a back surface of second housing 3, and a surface opposite to the back surface is also referred to as a front surface of second housing 3.

Figure 2:
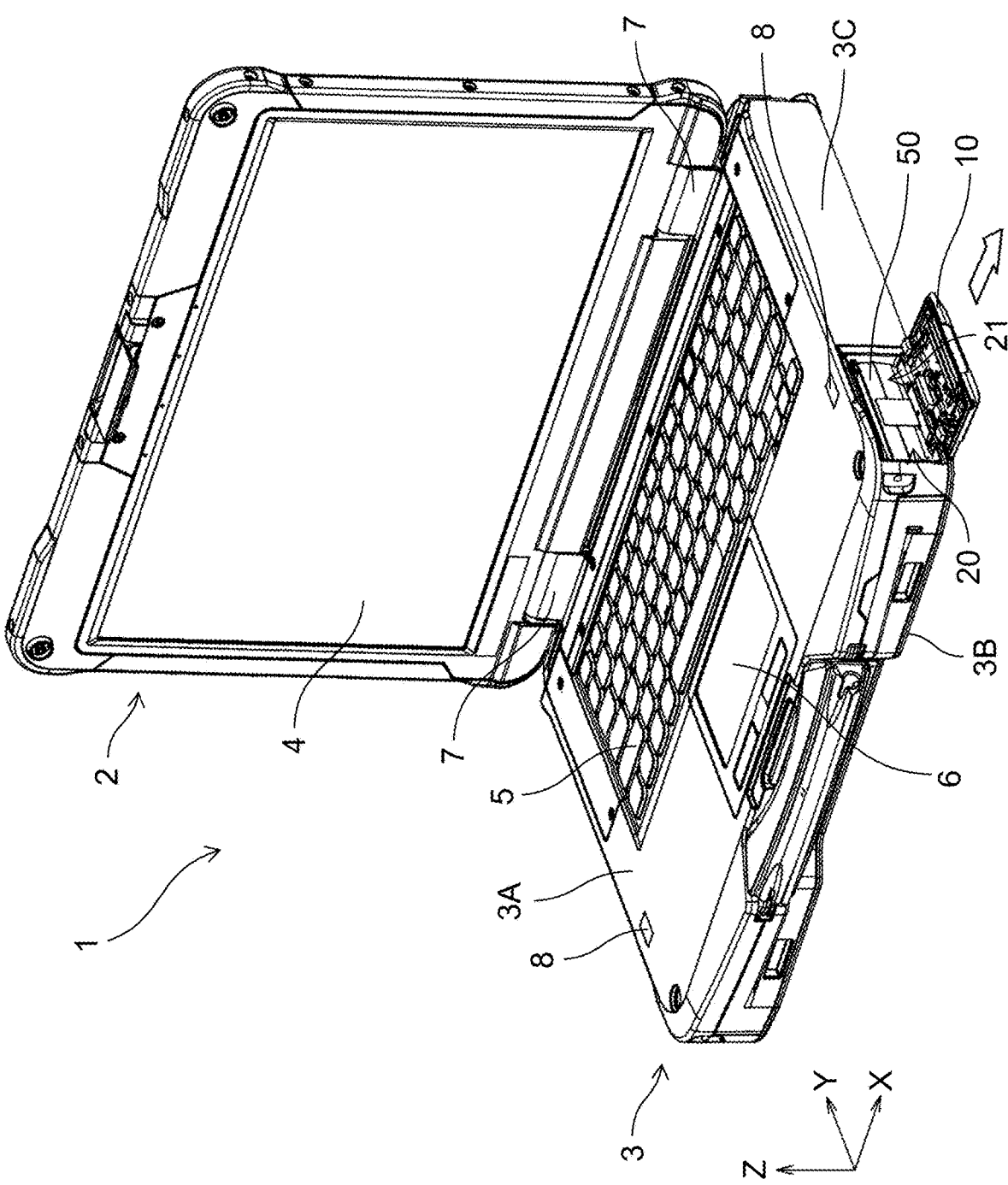
FIG. 2 is a schematic perspective view illustrating a state in which a battery is stored in a battery storage in the electronic device illustrated in FIG. 1.

As illustrated in FIG. 2, second housing 3 further includes battery storage 20 that stores battery 50. A white arrow along the X direction illustrated in FIG. 2 indicates a direction in which battery 50 is taken out from electronic device 1. In the present exemplary embodiment, one battery storage 20 is provided on each of the right side and the left side of side surface 3C when second housing 3 is viewed from the front surface, but one or three or more battery storages 20 may be provided on side surface 3C of second housing 3.

Figure 3:
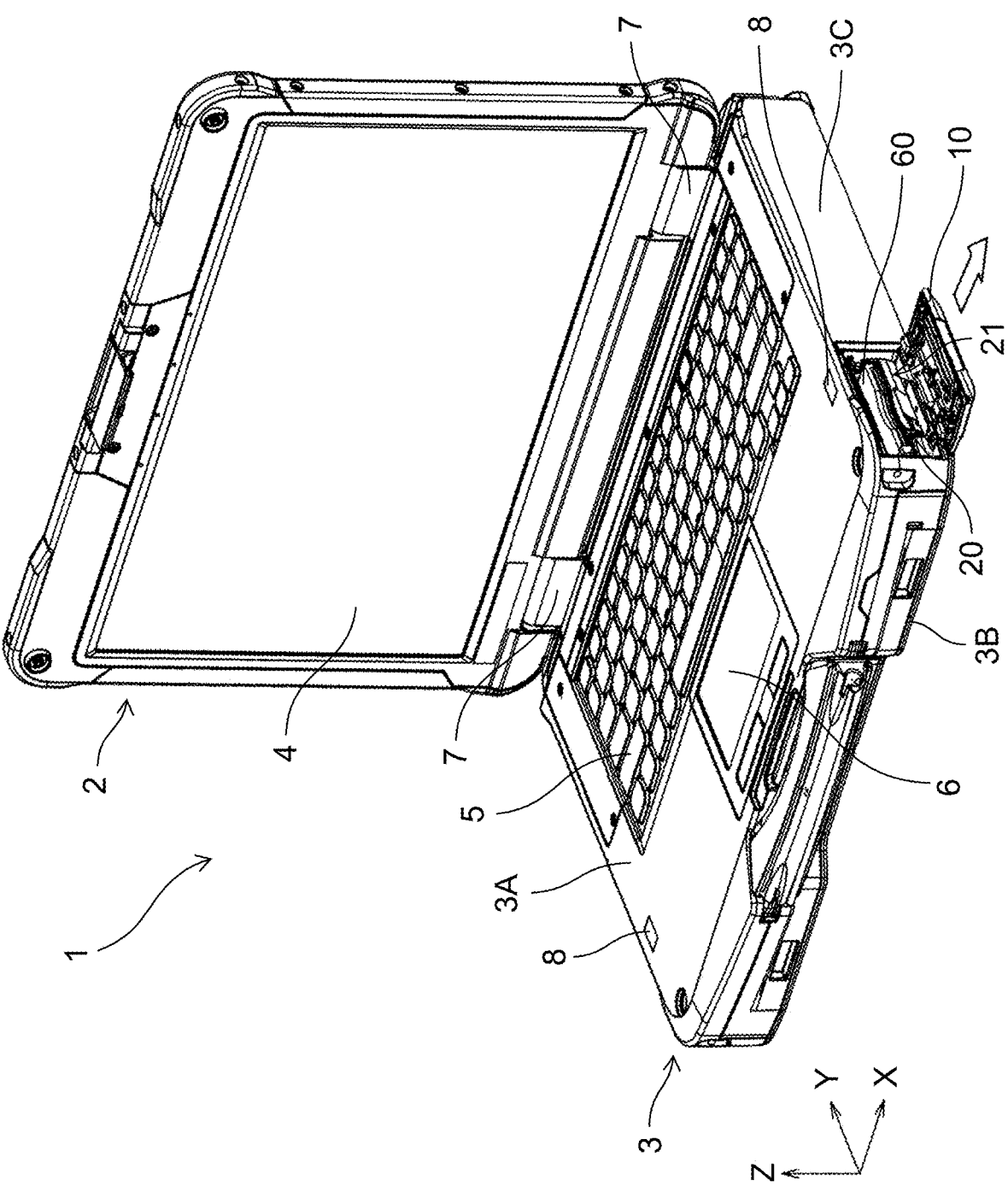
FIG. 3 is a schematic perspective view illustrating a state in which a card reader module is attached to the battery storage in the electronic device illustrated in FIG. 1.

As illustrated in FIG. 3, battery storage 20 is configured such that module 60 that reads or writes data from or to a storage medium can be attached. A white arrow along the X direction illustrated in FIG. 3 indicates a direction in which module 60 is taken out from electronic device 1.

(Battery Storage)

Figure 4:
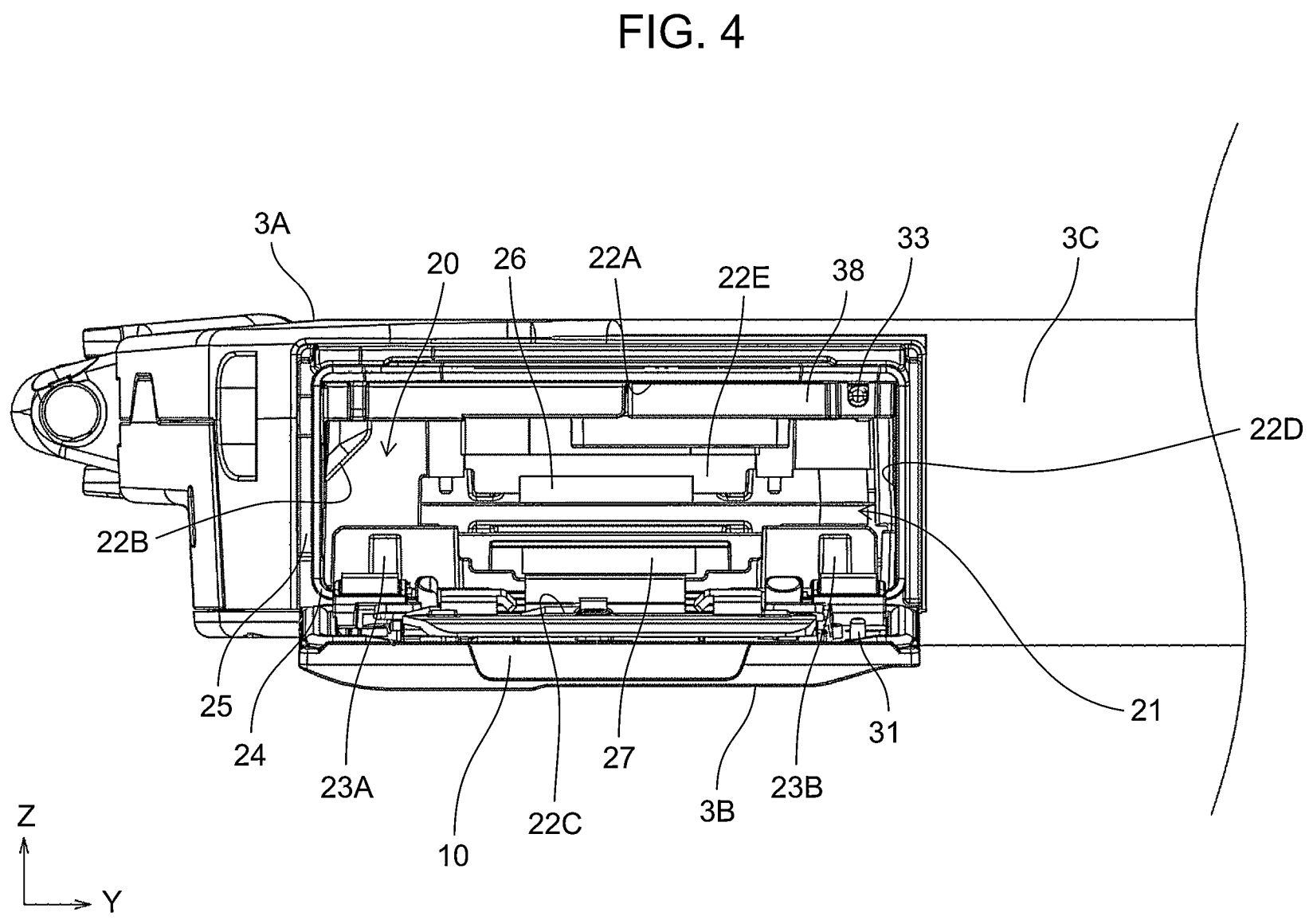

As illustrated in FIG. 4, battery storage 20 is defined by an inner wall of second housing 3. Battery storage 20 of second housing 3 includes component attachment and detachment opening 21 for attaching and detaching battery 50 and module 60.

Component attachment and detachment opening 21 is provided on side surface 3C of second housing 3. Specifically, component attachment and detachment opening 21 of one of two battery storages 20 is provided on the right side of side surface 3C when second housing 3 is viewed from the front surface. The component attachment and detachment opening of the other battery storage (not illustrated) is provided on the left side of side surface 3C when second housing 3 is viewed from the front surface.

As illustrated in FIG. 4, the inner wall defining battery storage 20 includes, for example, first inner wall 22A, second inner wall 22B, third inner wall 22C, fourth inner wall 22D, and fifth inner wall 22E. First inner wall 22A is an inner wall close to upper surface 3A of second housing 3. Third inner wall 22C is an inner wall that faces first inner wall 22A and is close to lower surface 3B of second housing 3. Second inner wall 22B is an inner wall close to the front surface of second housing 3. Fourth inner wall 22D is an inner wall that faces second inner wall 22B and is close to the back surface of second housing 3. Fifth inner wall 22E is an innermost inner wall of second housing 3 as viewed from component attachment and detachment opening 21. In the present specification, the two inner walls "facing" means that the two inner walls are disposed opposite to each other, and the two inner walls are not limited to be disposed in parallel.

More specifically, each of first inner wall 22A to fourth inner wall 22D has one end close to side surface 3C of second housing 3 and the other end far from side surface 3C of second housing 3 in the X direction, and extends in the X direction. Fifth inner wall 22E extends in the Y direction. In the Y-Z cross section of battery storage 20, first inner wall 22A to fourth inner wall 22D have a substantially rectangular shape.

Battery storage 20 may include a member other than the inner wall of second housing 3. First inner wall 22A to fifth inner wall 22E are not limited to flat surfaces, and may include steps, irregularities, and the like.

Figure 5:
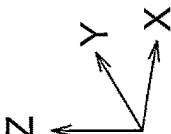
FIG. 5 is a schematic enlarged view of the battery storage of the electronic device illustrated in FIG. 1.

As illustrated in FIGS. 4 and 5, battery storage 20 includes peripheral wall 24 defining component attachment and detachment opening 21. Peripheral wall 24 is provided, for example, at one end in the X direction of each of first inner wall 22A to fourth inner wall 22D. Peripheral wall 24 is provided along one end in the X direction of each of first inner wall 22A to fourth inner wall 22D. When battery storage 20 is viewed from the X direction, peripheral wall 24 has a substantially rectangular shape. On side surface 3C of second housing 3, recessed portion 25 is formed around peripheral wall 24. Recessed portion 25 is a groove provided along the outer periphery of peripheral wall 24 on side surface 3C of second housing 3.

As illustrated in FIG. 4, battery storage 20 includes first terminal 26 connected to battery terminal 52 of battery 50 when battery 50 is stored in battery storage 20. Battery storage 20 includes second terminal 27 connected to module terminal 63 of module 60 when module 60 is stored in battery storage 20.

Different voltages are loaded on first terminal 26 and second terminal 27. Specifically, first terminal 26 is loaded with a rated voltage of battery 50, for example, a voltage between 5 V and 20 V (inclusive). A rated voltage of module 60, for example, a voltage between 4 V and 7 V (inclusive) is loaded on second terminal 27.

First terminal 26 and second terminal 27 are provided, for example, on fifth inner wall 22E. First terminal 26 is provided in a range on the upper side of fifth inner wall 22E. First terminal 26 is provided in a central portion in the Y direction of fifth inner wall 22E within the range. Second terminal 27 is provided, for example, below first terminal 26. Second terminal 27 is provided in a range on a lower side of fifth inner wall 22E. Second terminal 27 is provided in a central portion in the Y direction of fifth inner wall 22E within the range.

Figure 6:
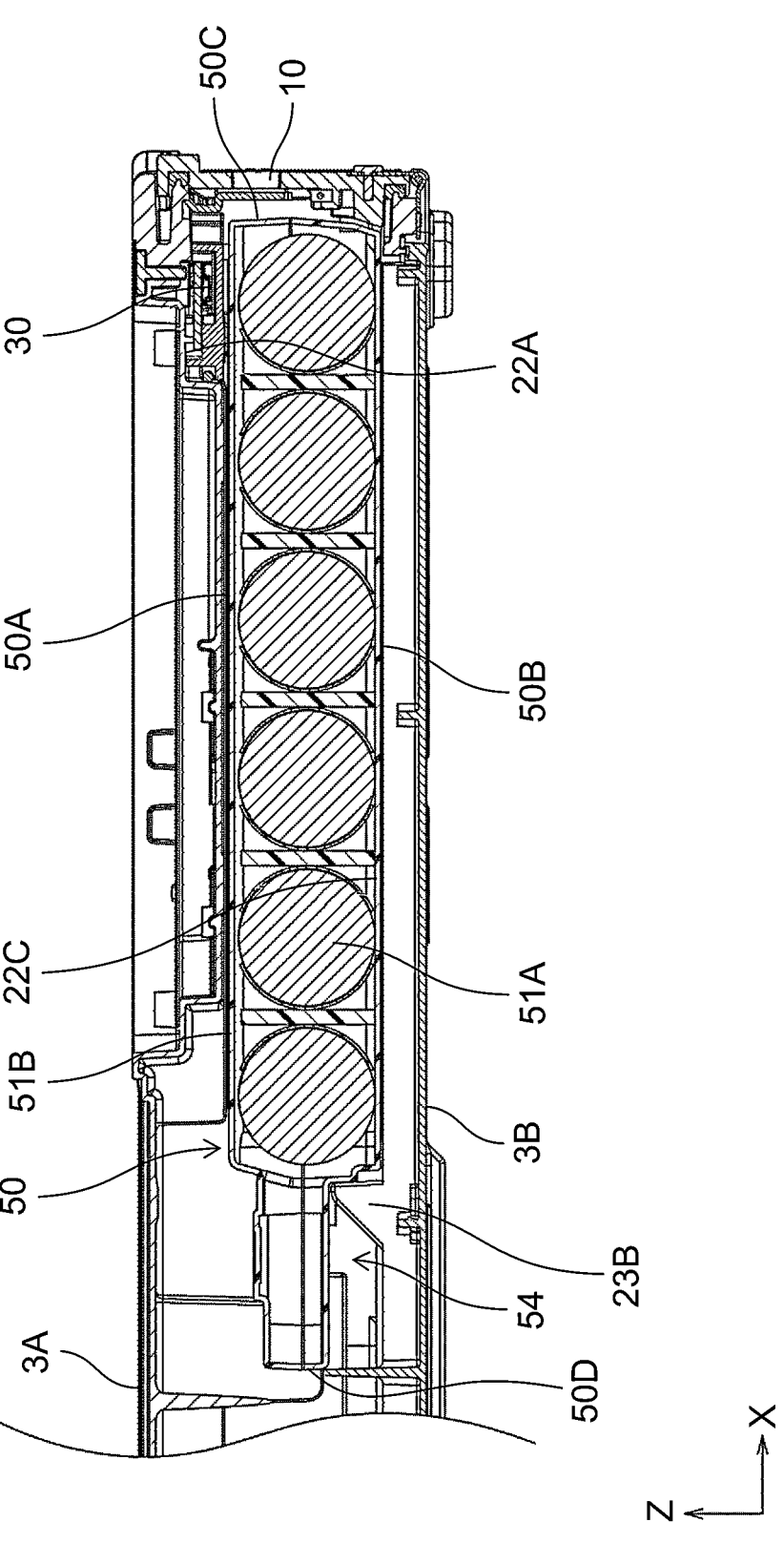
FIG. 6 is a cross-sectional view illustrating a part of an A-A cross section of the electronic device illustrated in FIG. 1.

As illustrated in FIGS. 4 and 6, battery storage 20 includes two projections 23A, 23B. When battery 50 is stored in battery storage 20, two projections 23A, 23B are stored in third recess 54 and fourth recess 55 of battery 50 described later. In addition, when module 60 is stored in battery storage 20, two projections 23A, 23B are stored in sixth recess 65 and seventh recess 66 of module 60 described later.

Two projections 23A, 23B are provided, for example, on third inner wall 22C. Two projections 23A, 23B have, for example, a triangular shape in the X-Z cross section. The length of two projections 23A, 23B in the Z direction is, for example, half or less of the distance between the first inner wall 22A and the third inner wall 22C, that is, the length of battery storage 20 in the Z direction.

As illustrated in FIG. 5, battery storage 20 is provided with first recess 28. When module 60 is attached to battery storage 20, stopper 62 of module 60 described later is inserted into first recess 28. First recess 28 is provided, for example, near one end of second inner wall 22B in the X direction.

(Lid Portion)

As illustrated in FIGS. 1 to 3, second housing 3 includes lid portion 10 that opens and closes component attachment and detachment opening 21 of battery storage 20. Lid portion 10 is provided on a side surface of second housing 3. By opening lid portion 10, battery 50 and module 60 can be attached to and detached from battery storage 20. By closing lid portion 10, the inside of battery storage 20 and the outside of second housing 3 can be separated from each other.

As illustrated in FIG. 5, lid portion 10 is connected to second housing 3 by, for example, second hinge portion 12.

Seal member 11 is disposed on the inner surface of lid portion 10. Specifically, a rectangular frame-shaped groove is provided on the inner surface of lid portion 10, and seal member 11 is disposed in the groove. Seal member 11 is, for example, an elastic member such as rubber. When lid portion 10 is closed, seal member 11 comes into contact with peripheral wall 24 of battery storage 20 to seal component attachment and detachment opening 21.

(Mechanical Switch)

Figure 7A:
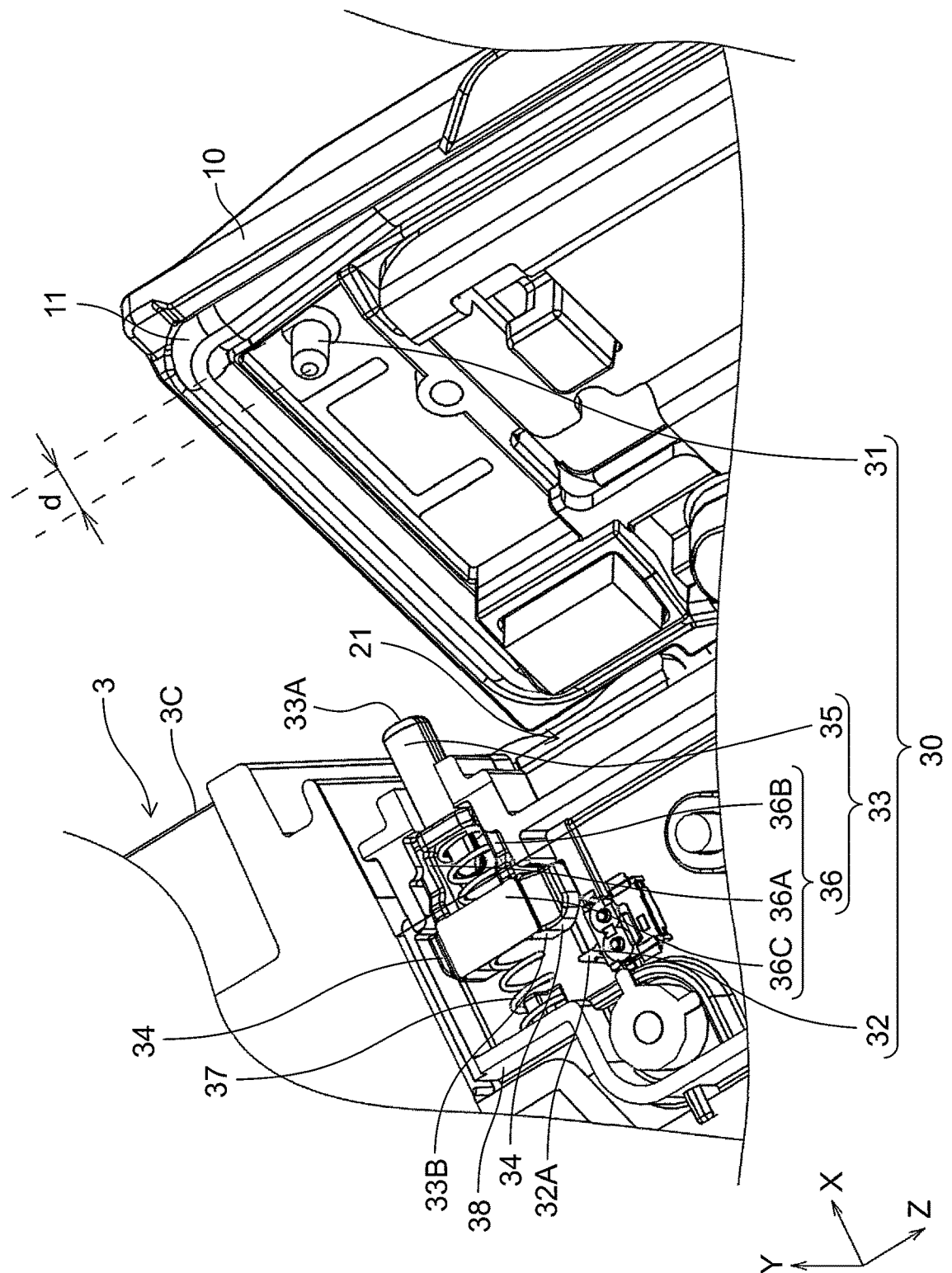
FIG. 7A is a view showing an internal structure of a mechanical switch when a lid portion is opened in the electronic device illustrated in FIG. 1.
Figure 7B:
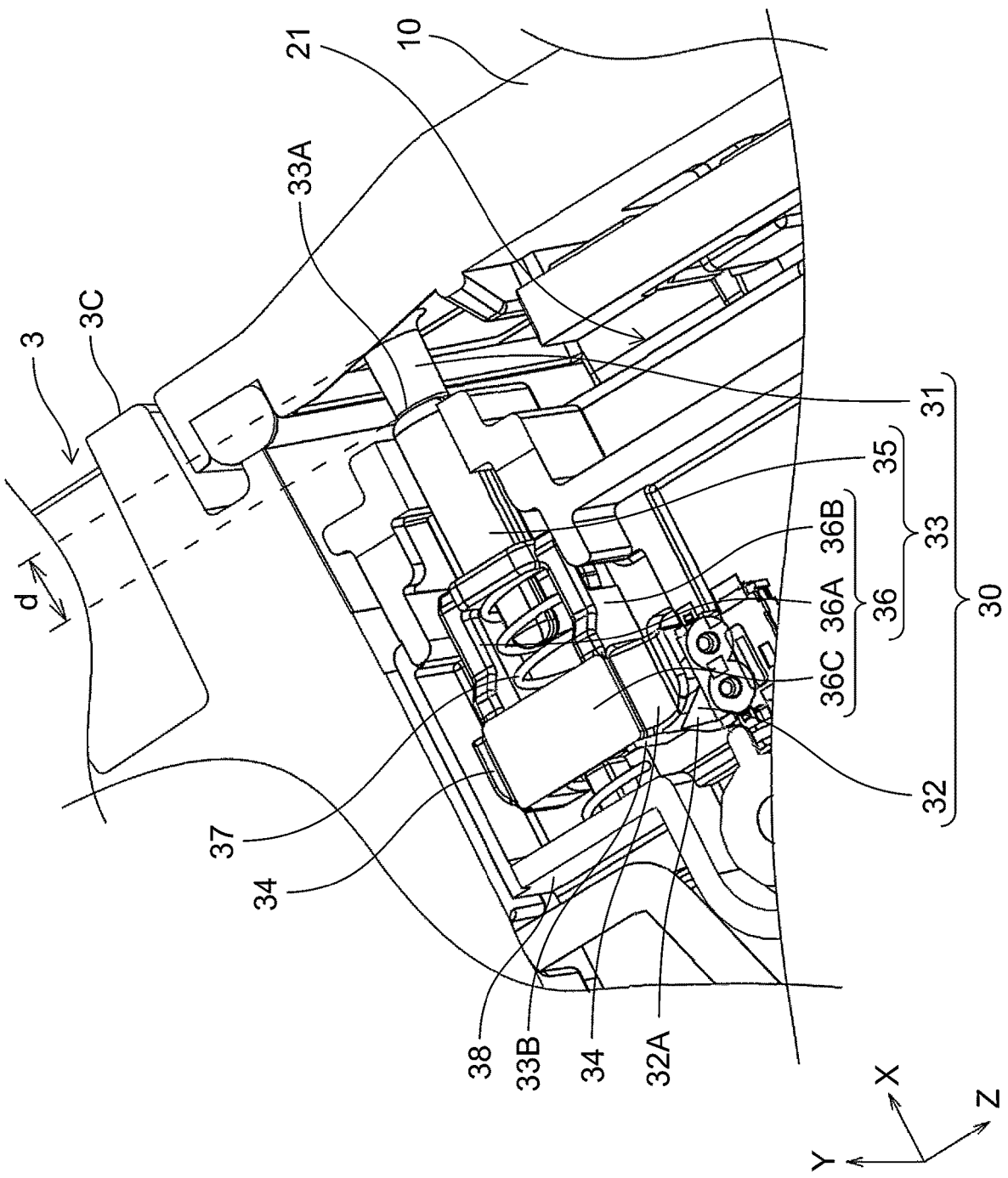
FIG. 7B is a view showing an internal structure of the mechanical switch when the lid portion is closed in the electronic device illustrated in FIG. 1.

Electronic device 1 includes mechanical switch 30 that detects an open or closed state of lid portion 10. As shown in FIGS. 7A and 7B, mechanical switch 30 includes protrusion 31, slide member 33, and lever 32 disposed around slide member 33. As illustrated in FIGS. 5, 7A, and 7B, protrusion 31 is provided on the inner surface of lid portion 10, and slide member 33 and lever 32 are provided in battery storage 20.

As illustrated in FIG. 7A, protrusion 31 is provided inside seal member 11 of lid portion 10. Protrusion 31 is provided at a position in contact with slide member 33 when lid portion 10 is closed. The length from the inner surface of lid portion 10 to the tip of protrusion 31 is length d. Length d is, for example, between 2 mm and 3 mm (inclusive). Protrusion 31 has, for example, a cylindrical shape.

As illustrated in FIGS. 4 to 6, slide member 33 and lever 32 are disposed on first inner wall 22A of battery storage 20. As illustrated in FIG. 6, first inner wall 22A is provided with a step where slide member 33 and lever 32 are disposed. As illustrated in FIG. 5, slide member 33 the lever 32 are disposed in the vicinity of indicator 8 to be described later. Slide member 33 and lever 32 are disposed on first inner wall 22A below indicator 8, for example. As illustrated in FIGS. 7A and 7B, slide member 33 and lever 32 are covered with switch cover 38. Switch cover 38 is fixed to first inner wall 22A with, for example, a screw or the like.

Slide member 33 is a member that slides and moves in the X direction. Slide member 33 slides and moves in the X direction between a position close to side surface 3C of second housing 3 illustrated in FIG. 7A and a position far from second housing 3 illustrated in FIG. 7B. As illustrated in FIGS. 7A and 7B, slide member 33 includes, in the X direction, first end 33A close to side surface 3C of second housing 3 and second end 33B far from side surface 3C of second housing 3. At least first end 33A of slide member 33 is exposed from switch cover 38. First end 33A of slide member 33 comes into contact with protrusion 31 provided on lid portion 10 when lid portion 10 is closed.

Slide member 33 further includes flap 34 extending in a direction intersecting the sliding direction (X direction) of slide member 33. Specifically, flap 34 extends from slide member 33 in the Y direction. Flap 34 is provided, for example, at second end 33B opposite to first end 33A.

Slide member 33 includes, for example, head 35 including first end 33A and main body 36 including second end 33B. Head 35 has, for example, a cylindrical shape. Main body 36 includes, for example, first leg 36A and second leg 36B bifurcated from main body 36. First leg 36A and second leg 36B extend in the X direction. Main body 36 further includes, at second end 33B, connection portion 36C that connects one end in the Z direction of first leg 36A and one end in the Z direction of second leg 36B. Flap 34 is provided at each of second end 33B of first leg 36A and the second end 33B of second leg 36B. Flap 34 may be provided on a leg close to lever 32, that is, second leg 36B in FIGS. 7A and 7B, and does not need to be provided on a leg far from lever 32, that is, first leg 36A in FIGS. 7A and 7B.

One end of first spring 37 is connected to slide member 33. First spring 37 is disposed extending in the X direction. The other end of first spring 37 is connected to and fixed to a part of switch cover 38. The other end of first spring 37 is located farther than one end of first spring 37 with respect to side surface 3C of second housing 3.

Specifically, first spring 37 is connected to head 35 of slide member 33, for example. For example, first spring 37 extends between first leg 36A and second leg 36B. A part of first spring 37 is covered with, for example, connection portion 36C.

Lever 32 is disposed around slide member 33 in a direction intersecting the sliding direction (X direction) of slide member 33. Specifically, lever 32 is disposed around slide member 33 in the Y direction.

Lever 32 has contact portion 32A. Lever 32 moves as flap 34 and contact portion 32A come into contact with each other or separate from each other in accordance with the sliding movement of slide member 33.

Lever 32 is, for example, an elongated member having contact portion 32A at one end. The other end (not illustrated) of lever 32 is fixed to switch cover 38. Contact portion 32A has, for example, a substantially triangular prism shape.

One end of a second spring (not illustrated) is connected to lever 32. One end of the second spring is connected to, for example, the vicinity of the other end of lever 32. The other end of the second spring is connected and fixed to switch cover 38.

As illustrated in FIG. 7A, when lid portion 10 is opened, slide member 33 is located at a first slide position. The first slide position is a position where slide member 33 does not come into contact with lever 32. Specifically, the first slide position is a position close to side surface 3C. When slide member 33 is located at the first slide position, lever 32 is located at a first lever position. The first lever position is a position where lever 32 does not come into contact with slide member 33. Specifically, the first lever position is a position where lever 32 is separated from flap 34 and lever 32 does not load a force on the second spring.

When lid portion 10 is closed from a state where lid portion 10 is opened (state shown in FIG. 7A), as shown in FIG. 7B, protrusion 31 comes into contact with first end 33A of slide member 33. Protrusion 31 in contact with first end 33A causes slide member 33 to slide and move in the X direction while loading a force to slide member 33. Accordingly, the force loaded to first spring 37 increases, and first spring 37 contracts. When slide member 33 slides and moves, flap 34 comes into contact with lever 32, and moves lever 32 from the first lever position while applying a force to lever 32. Lever 32 to which the force is applied by flap 34 rotates and moves about the other end within a predetermined angular range. As lever 32 moves, the second spring is loaded with a force and compressed.

When lid portion 10 is further closed, slide member 33 reaches the second slide position. The second slide position is a position moved from the first slide position in the X direction by length d of protrusion 31. The second slide position is a position far from side surface 3C of second housing 3. When slide member 33 reaches the second slide position, lever 32 reaches the second lever position. The second lever position is a position where lever 32 is rotated from the first slide position by a predetermined angle.

The distance between the first slide position and the second slide position, that is, length d of protrusion 31 is a stroke length of slide member 33.

When lid portion 10 is opened from a state in which lid portion 10 is closed (a state shown in FIG. 7B), first, a force loaded to slide member 33 from protrusion 31 decreases. As a result, the force loaded to first spring 37 decreases, and first spring 37 expands. Slide member 33 slides and moves in the X direction by the biasing force of first spring 37. Due to the movement of slide member 33, the force loaded to lever 32 from flap 34 decreases, and the second spring expands.

When lid portion 10 is further opened and protrusion 31 is separated from slide member 33, slide member 33 reaches the first slide position by the biasing force of first spring 37. Flap 34 is separated from lever 32. As a result, lever 32 reaches the first lever position by the biasing force of the second spring.

The controller (for example, the CPU) of electronic device 1 detects the opening and closing of lid portion 10 based on the position of lever 32.

When lever 32 is located at the first lever position, the controller detects that lid portion 10 is opened. When lever 32 is located at the second lever position, the controller detects that lid portion 10 is opened.

For example, when lever 32 is located at the second lever position, a predetermined signal is sent to the controller, and when lever 32 is located at the first lever position, the predetermined signal is not sent to the controller, whereby the specific open or close state is detected.

(Indicator)

As illustrated in FIG. 1, electronic device 1 further includes indicator 8 that indicates possibility of attachment and detachment of battery 50 stored in battery storage 20. Indicator 8 is provided for each battery storage 20. Indicator 8 is disposed on upper surface 3A among the surfaces of second housing 3. As illustrated in FIG. 5, indicator 8 is disposed in the vicinity of mechanical switch 30, for example, on upper surface 3A above slide member 33 or lever 32.

Indicator 8 may further indicate possibility of attachment and detachment of module 60 when module 60 is stored in battery storage 20.

Indicator 8 includes, for example, a light emitting diode (LED), and indicates to the user whether hot swapping of battery 50 and module 60 is possible according to the lighting state of the LED. In other words, indicator 8 changes the lighting state of the LED according to whether or not battery 50 and module 60 can be hot-swapped. The lighting state of the LED is, for example, lighting of the LED, blinking of the LED, turning off of the LED, color of lighting or blinking of the LED, or the like.

When mechanical switch 30 detects that lid portion 10 is opened while battery 50 is stored in battery storage 20, electronic device 1 changes the main electric supply line to the sub battery or the electric power source. This enables attachment and detachment of battery 50, that is, hot swapping. When hot swapping is enabled, indicator 8 indicates to the user that hot swapping is enabled. As described above, the controller of electronic device 1 detects the open or close state of lid portion 10 according to the position of lever 32, and indicator 8 indicates possibility of attachment and detachment of battery 50 according to the detected open or close state of lid portion 10.

When detecting that lid portion 10 is opened by mechanical switch 30 while module 60 is stored in battery storage 20, electronic device 1 detects whether or not module 60 is writing or reading to or from the storage medium. When it is detected that module 60 is writing to or reading from the storage medium, indicator 8 indicates to the user that hot swapping is not possible. When it is detected that module 60 is not writing to or reading from the storage medium, indicator 8 indicates to the user that hot swapping is possible.

When indicator 8 includes an LED, the lighting state of the LED changes as follows, for example.

(i) The LED is turned off when battery 50 or module 60 is not stored in battery storage 20 and when it is detected that battery 50 or module 60 is stored in battery storage 20 and lid portion 10 is closed.

(ii) When it is detected that battery 50 or module 60 is stored in battery storage 20 and lid portion 10 is opened, but hot swapping of battery 50 or module 60 is not possible, the LED is turned on. For example, the LED lights up in red.

(iii) When it is detected that battery 50 or module 60 is stored in battery storage 20 and lid portion 10 is opened, and hot swapping of battery 50 or module 60 is possible, the LED lights up in a color different from that in the above (ii). For example, the LED lights up in green.

In the above example, whether or not battery 50 and module 60 can be hot-swapped is indicated by a difference in the color of the LED to be turned on, but may be indicated by turning on and off the LED. For example, the LED may be turned on (or off) when hot swapping is possible, and the LED may be turned off (or on) when hot swapping is not possible.

(Battery)

As illustrated in FIG. 6, battery 50 stored in battery storage 20 includes one or more battery cells 51A and battery case 51B enclosing battery cells 51A.

Figure 8:
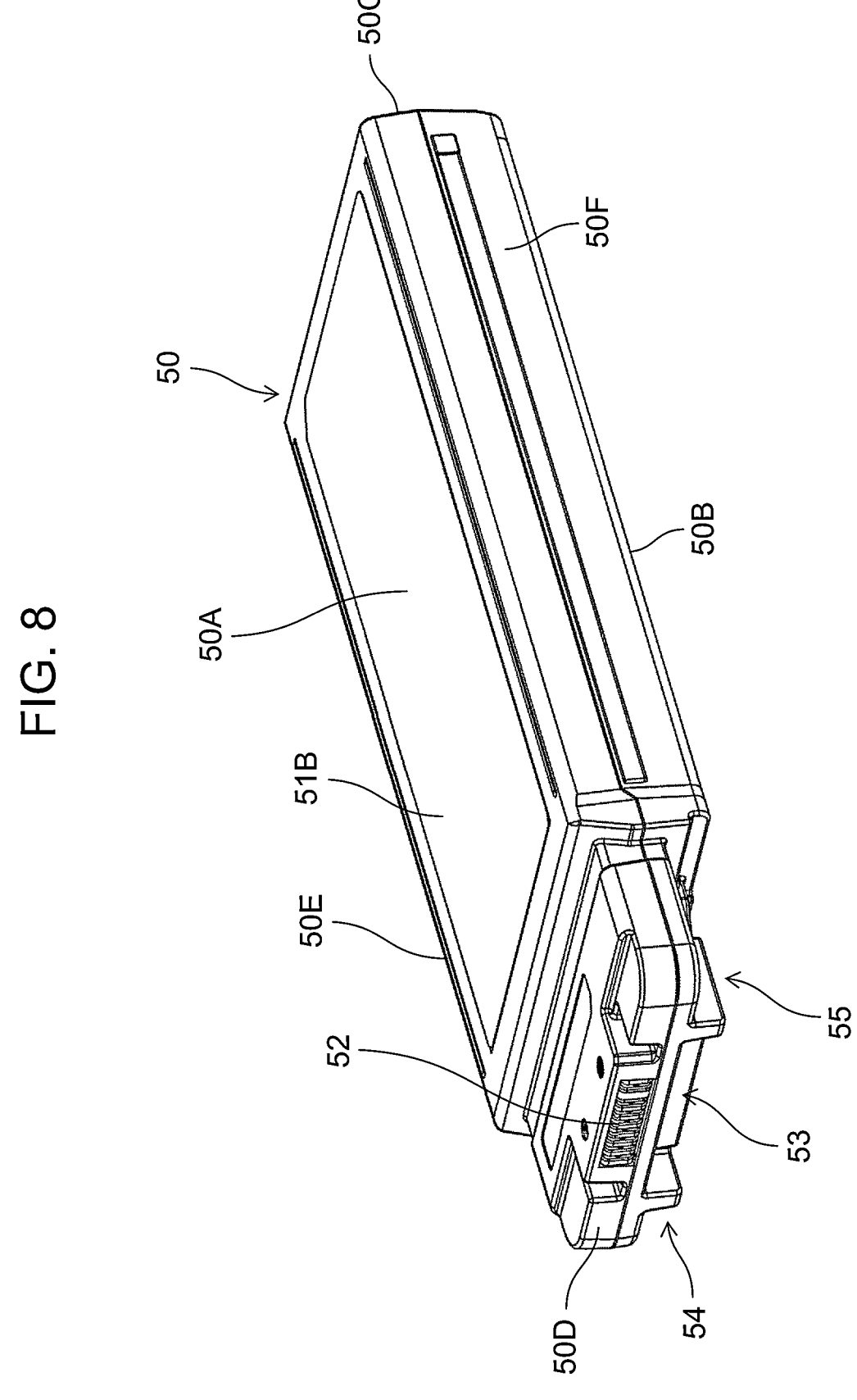
FIG. 8 is a schematic perspective view illustrating an example of a battery stored in the battery storage of the electronic device illustrated in FIG. 1.

As illustrated in FIG. 8, battery 50 includes battery terminal 52 electrically connected to first terminal 26 of battery storage 20. Battery 50 has second recess 53 that stores second terminal 27 of battery storage 20 when battery 50 is stored in battery storage 20. Battery 50 has third recess 54 and fourth recess 55 in which projections 23A, 23B of battery storage 20 are stored when battery 50 is stored in battery storage 20.

Specifically, battery 50 has a substantially rectangular parallelepiped shape including upper surface 50A and lower surface 50B facing each other, first short side surface 50C and second short side surface 50D facing each other, and first long side surface 50E and second long side surface 50F facing each other. In the present specification, "two surfaces are opposed" means that the two surfaces are arranged to face each other, and is not limited to that the two surfaces are arranged in parallel. Upper surface 50A, lower surface 50B, first short side surface 50C, second short side surface 50D, first long side surface 50E, and second long side surface 50F are not limited to flat surfaces, and may include steps, irregularities, and the like.

Battery 50 is stored in battery storage 20 such that first short side surface 50C is exposed to component attachment and detachment opening 21.

Battery terminal 52 is provided on second short side surface 50D. Battery terminal 52 is provided in a range on the upper side of second short side surface 50D. Battery terminal 52 is provided in a central portion in the width direction of second short side surface 50D within the above range. The width direction of second short side surface 50D means a direction from an end connected to first long side surface 50E toward an end connected to second long side surface 50F on second short side surface 50D (or a direction opposite to the direction).

Second recess 53 is provided on second short side surface 50D. Second recess 53 is provided in a range on a lower side of second short side surface 50D. Second recess 53 is provided in a central portion in the width direction of second short side surface 50D within the range. Second recess 53 is provided across second short side surface 50D and lower surface 50B. That is, second recess 53 has openings in second short side surface 50D and lower surface 50B.

Third recess 54 and fourth recess 55 are provided on second short side surface 50D. Third recess 54 and fourth recess 55 are provided on the lower side of second short side surface 50D. Third recess 54 and fourth recess 55 are provided on second short side surface 50D with second recess 53 interposed therebetween. Third recess 54 is provided across second short side surface 50D, lower surface 50B, and first long side surface 50E. That is, third recess 54 has openings in second short side surface 50D, lower surface 50B, and first long side surface 50E. Fourth recess 55 is provided across second short side surface 50D, lower surface 50B, and second long side surface 50F. That is, second short side surface 50D, lower surface 50B, and second long side surface 50F have openings.

(Module)

Module 60 stored in battery storage 20 reads or writes data from or to a storage medium. The storage medium is a magnetic storage medium. The storage medium is, for example, an IC contact type card with a magnetic stripe. Module 60 includes reader 61A and reader module package 61B including reader 61A. Reader 61A has storage medium insertion port 67. Storage medium insertion port 67 is exposed from reader module package 61B. That is, storage medium insertion port 67 is exposed on the surface of module 60. Module 60 also includes stopper 62. Stopper 62 fixes module 60 in battery storage 20 when module 60 is stored in battery storage 20.

Figure 9A:
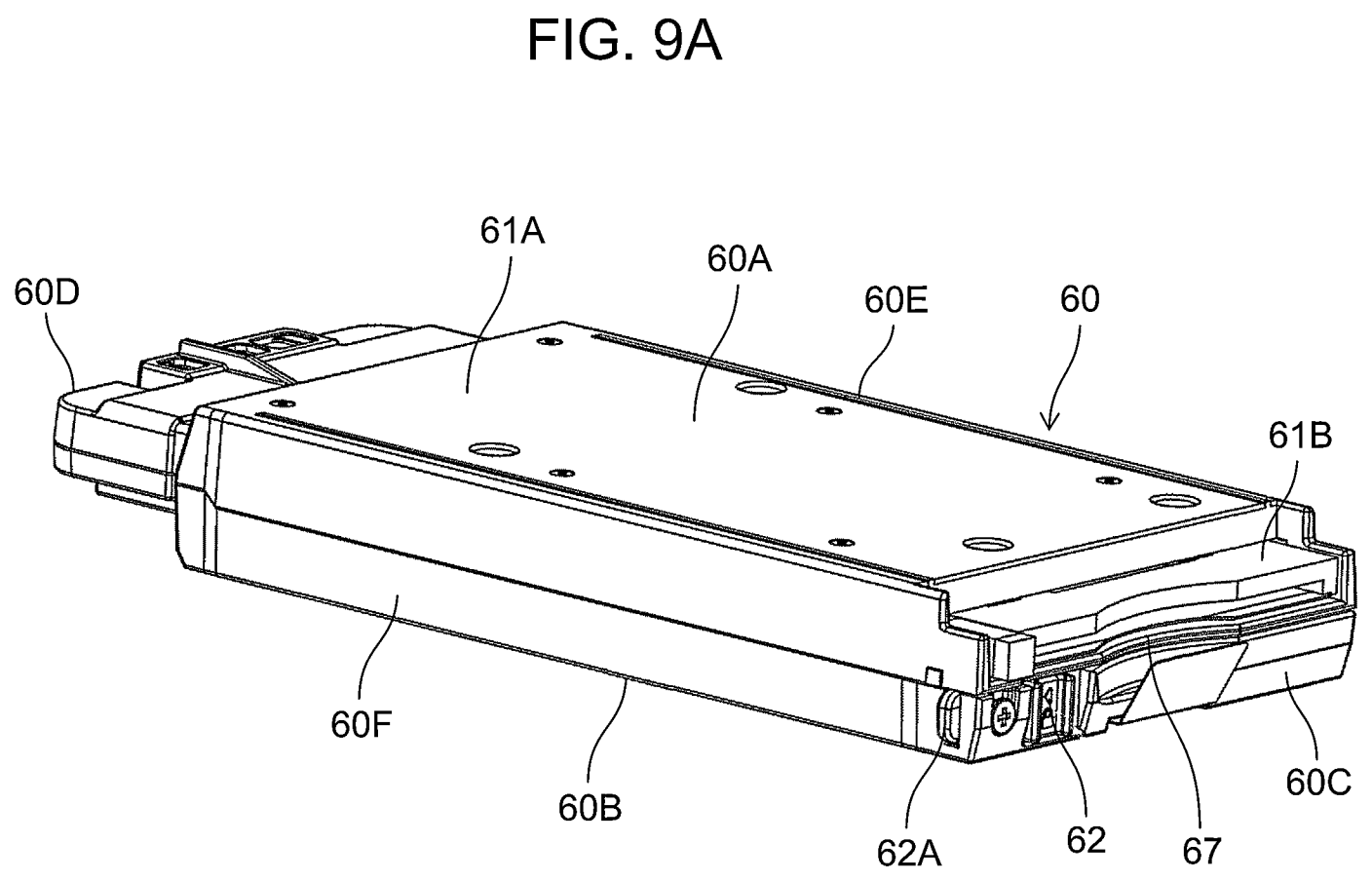
Figure 9B:
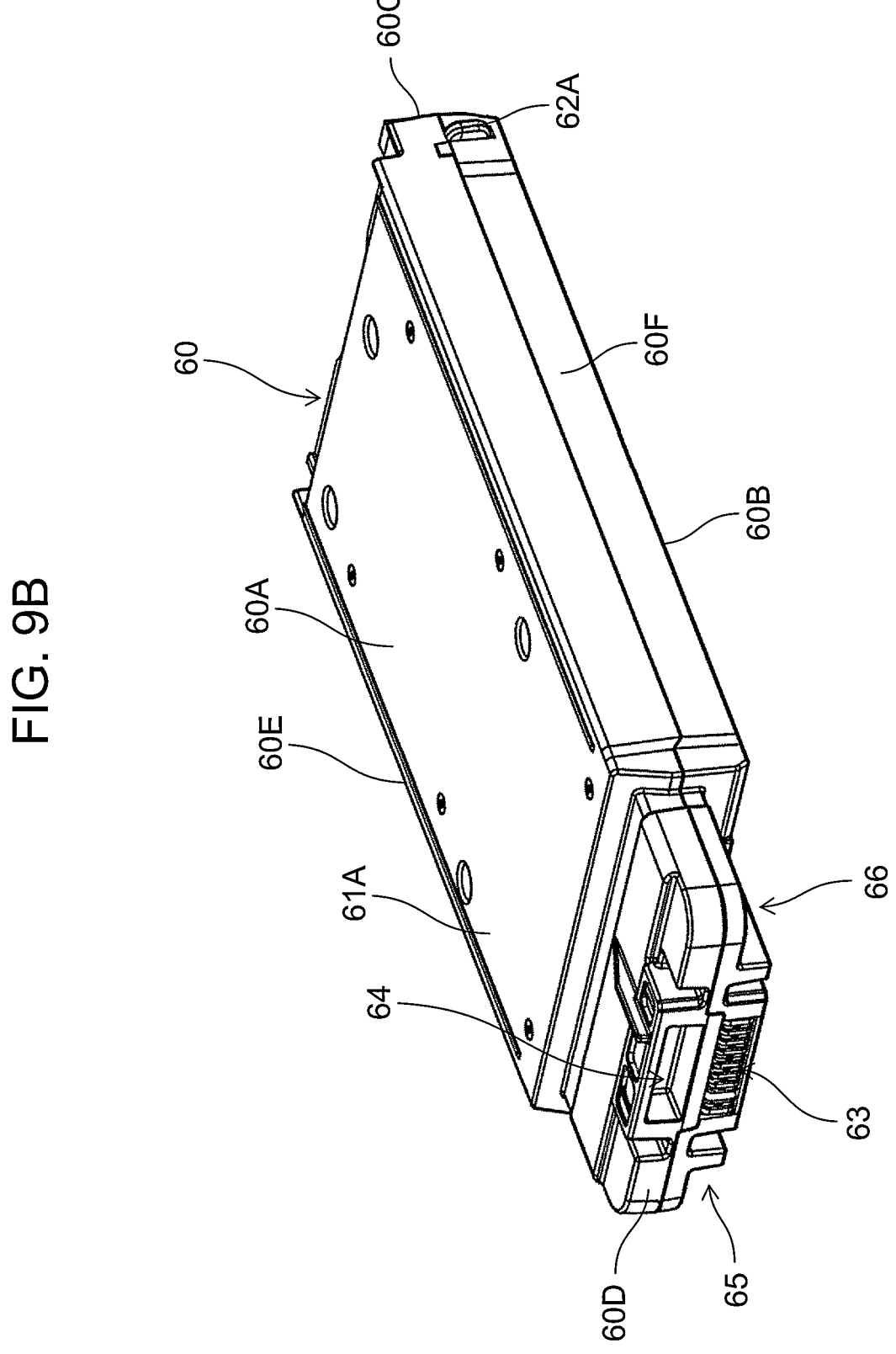
FIG. 9B is another schematic perspective view illustrating an example of the card reader module stored in the battery storage of the electronic device illustrated in FIG. 1.

As illustrated in FIGS. 9A and 9B, module 60 includes module terminal 63 electrically connected to second terminal 27 of battery storage 20. Module 60 has fifth recess 64 that stores first terminal 26 of battery storage 20 when module 60 is stored in battery storage 20. Module 60 has sixth recess 65 and seventh recess 66 in which projections 23A, 23B of battery storage 20 are stored when module 60 is stored in battery storage 20.

Specifically, module 60 has a substantially rectangular parallelepiped shape including upper surface 60A and lower surface 60B facing each other, first short side surface 60C and second short side surface 60D facing each other, and first long side surface 60E and second long side surface 60F facing each other. Upper surface 60A, lower surface 60B, first short side surface 60C, second short side surface 60D, first long side surface 60E, and second long side surface 60F are not limited to flat surfaces, and may include steps, irregularities, and the like.

Module 60 is stored in battery storage 20 such that first short side surface 60C is exposed to component attachment and detachment opening 21.

As illustrated in FIG. 9A, storage medium insertion port 67 is exposed to first short side surface 60C of module 60.

Stopper 62 is, for example, a member that moves along the surface of module 60. Stopper 62 moves between a stopper storage position and a stopper protruding position. The stopper storage position is a position where stopper 62 is stored in module 60. The stopper protruding position is a position where stopper 62 protrudes from the surface of module 60. Stopper 62 is provided, for example, on first short side surface 60C.

When module 60 is stored in battery storage 20 or taken out from battery storage 20, stopper 62 is disposed at the stopper storage position. When stopper 62 is set at the stopper protruding position while module 60 is stored in battery storage 20, tip portion 62A is inserted into first recess 28 of battery storage 20 illustrated in FIG. 5.

As illustrated in FIG. 9B, module terminal 63 is provided on second short side surface 60D. Module terminal 63 is provided in a range on the lower side of second short side surface 60D. Module terminal 63 is provided in a central portion in the width direction of second short side surface 60D within the above range. The width direction of second short side surface 60D means a direction from an end connected to first long side surface 60E toward an end connected to second long side surface 60F (or a direction opposite to the direction) on second short side surface 60D.

Sixth recess 65 and seventh recess 66 are provided on second short side surface 60D. Sixth recess 65 and seventh recess 66 are provided on the lower side of second short side surface 60D. Sixth recess 65 and seventh recess 66 are provided on second short side surface 60D with module terminal 63 interposed therebetween. Sixth recess 65 is provided across second short side surface 60D, lower surface 60B, and first long side surface 60E. That is, sixth recess 65 has openings in second short side surface 60D, lower surface 60B, and first long side surface 60E. Seventh recess 66 is provided across second short side surface 60D, lower surface 60B, and second long side surface 60F. That is, seventh recess 66 has openings in second short side surface 60D, lower surface 60B, and second long side surface 60F.

Fifth recess 64 is provided on second short side surface 60D. Fifth recess 64 is provided in a range on the upper side of second short side surface 60D. Fifth recess 64 is provided in a central portion in the width direction of second short side surface 50D within the range. Fifth recess 64 has an opening in second short side surface 60D.

Effects

In electronic device 1 configured as described above, battery 50 and module 60 can be attached to battery storage 20. Accordingly, usability can be improved.

In electronic device 1 configured as described above, module 60 can read and write data from and to the magnetic storage medium, and mechanical switch 30 can detect the open or close state of lid portion 10.

Generally, in an electronic device including a battery storage, opening and closing of the lid portion is detected by a magnetic sensor switch provided in the lid portion and the battery storage. The magnetic sensor switch includes, for example, a magnet. When the opening and closing of the lid portion is detected by such a magnetic sensor switch, there is a problem that the magnetic storage medium is magnetically affected by the magnet of the magnetic sensor switch. Specifically, when the magnetic storage medium is inserted into a module attached to the battery storage or when the magnetic storage medium is taken out from the module, the magnetic storage medium passes near the magnet of the magnetic sensor switch. At this time, there is a problem that data stored in the magnetic storage medium may be lost due to a magnetic influence from the magnet.

However, in electronic device 1 including mechanical switch 30 as described above, the magnetic storage medium is not magnetically affected by the mechanism that detects the open and close state of lid portion 10. As a result, even when module 60 that reads and writes data from and to the magnetic storage medium is attached to battery storage 20, data can be read or written from or to the magnetic storage medium without being magnetically affected by the mechanism that detects the open and close state of lid portion 10.

In electronic device 1 configured as described above, since lever 32 is disposed in the direction intersecting the sliding direction of slide member 33, the stroke length of slide member 33 can be increased. As a result, a state in which slide member 33 is in contact with lever 32 and a state in which slide member 33 is separated from lever 32 are clearly distinguished. That is, the first lever position and the second lever position of lever 32 are clearly distinguished. As a result, it is possible to prevent electronic device 1 from erroneously detecting the open and close state of lid portion 10.

In electronic device 1 configured as described above, when mechanical switch 30 is disposed inside peripheral wall 24 defining component attachment and detachment opening 21 and lid portion 10 is closed, peripheral wall 24 and seal member 11 come into contact with each other to seal component attachment and detachment opening 21. As a result, it is possible to prevent liquid such as water from flowing into second housing 3 from component attachment and detachment opening 21, and a waterproof effect is obtained for mechanical switch 30.

In electronic device 1 configured as described above, lid portion 10 and component attachment and detachment opening 21 are provided on the side surface of second housing 3. As a result, battery 50 and module 60 can be easily attached to and detached from battery storage 20.

Electronic device 1 configured as described above includes first terminal 26 and second terminal 27 disposed at different positions and loaded with different voltages. This makes it possible to prevent battery 50 from being connected to second terminal 27 and module 60 from being connected to first terminal 26. That is, it is possible to prevent a voltage different from the rated voltage from being loaded on battery 50 and module 60.

In electronic device 1 configured as described above, when module 60 is attached to battery storage 20, stopper 62 of module 60 is inserted into first recess 28 of battery storage 20. Thus, module 60 can be fixed to battery storage 20.

Electronic device 1 configured as described above includes indicator 8 that indicates possibility of attachment and detachment of battery 50 on the upper surface of second housing 3. As a result, the user can easily confirm possibility of attachment and detachment of battery 50 stored in battery storage 20. With such a configuration, the user can easily check indicator 8.

Indicator 8 of electronic device 1 configured as described above indicates possibility of attachment and detachment of module 60. As a result, it is possible to easily confirm possibility of attachment and detachment of module 60 stored in battery storage 20.

In electronic device 1 configured as described above, indicator 8 indicates possibility of attachment and detachment of battery 50 and module 60 by turning on and off the LED. This allows the user to easily check indicator 8.

Electronic device 1 configured as described above includes projections 23A, 23B in battery storage 20. Battery 50 includes third recess 54 and fourth recess 55 on the lower side of second short side surface 50D, and module 60 includes sixth recess 65 and seventh recess 66 on the lower side of second short side surface 60D. Accordingly, when battery 50 and module 60 are stored in battery storage 20, it is possible to prevent erroneous storage in the vertical direction. As a result, it is possible to prevent battery 50 from being connected to second terminal 27, and prevent module 60 from being connected to first terminal 26.

Although the present disclosure has been fully described with reference to preferred exemplary embodiments and with reference to the accompanying drawings, various changes and modifications will become apparent to those skilled in the art. Such variations and modifications are to be understood as being included within the scope of the present disclosure as set forth in the appended scope of claims unless departing from the scope of the present disclosure.

INDUSTRIAL APPLICABILITY

Since usability can be improved, the present disclosure is applied to, for example, an electronic device (for example, a laptop PC, a tablet PC, or the like) that stores a battery therein.

REFERENCE MARKS IN THE DRAWINGS 1 electronic device,
2 first housing
3 second housing 4 display
5 keyboard
6 touch pad
7 first hinge portion
8 indicator
10 lid portion
11 seal member
12 second hinge portion
20 battery storage
21 component attachment and detachment opening
22A to 22E first inner wall to fifth inner wall
23A, 23B projection
24 peripheral wall
25 recessed portion
26 first terminal
27 second terminal
28 first recess
30 mechanical switch
31 protrusion
32 lever
32A contact portion
33 slide member
33A first end
33B second end
34 flap
35 head
36 main body
36A first leg
36B second leg
36C connection portion
37 first spring
38 switch cover
50 battery
50A upper surface
50B lower surface
50C first short side surface
50D second short side surface
50E first long side surface
50F second long side surface
51A battery cell
51B battery case
52 battery terminal
53 second recess
54 third recess
55 fourth recess
60 module
60A upper surface
60B lower surface
60C first short side surface
60D second short side surface
60E first long side surface
60F second long side surface
61A reader
61B reader module package
62 stopper
62A tip portion
63 module terminal
64 fifth recess
65 sixth recess
66 seventh recess
67 storage medium insertion port

The invention claimed is:
1. An electronic device comprising:
a battery storage that stores a battery; and
a housing provided with the battery storage, wherein the battery storage is configured to be attachable to a module that reads or writes data of a storage medium, wherein the battery storage includes a component attachment and detachment opening for attaching and detaching the battery and the module, the electronic device further includes a lid portion that opens and closes the component attachment and detachment opening, and a mechanical switch configured to detect an open and close state of the lid portion, and the storage medium is a magnetic storage medium, the mechanical switch includes a slide member slidably arranged in the battery storage, a lever disposed around the slide member in a direction intersecting a sliding direction of the slide member, and a protrusion provided on the lid portion, and when the lid portion is closed, the slide member slides and moves by coming into contact with the protrusion to move the lever.

2. The electronic device according to claim 1, further comprising:

a peripheral wall that defines the component attachment and detachment opening; and a seal member provided on the lid portion, wherein the mechanical switch is disposed inside the peripheral wall, and when the lid portion is closed, the peripheral wall and the seal member come into contact with each other, and the component attachment and detachment opening is sealed.

3. The electronic device according to claim 1, wherein the lid portion is disposed on a side surface of the housing, and the component attachment and detachment opening is provided on a side surface of the housing.

4. The electronic device according to claim 1, wherein the battery storage includes a first terminal connected to the battery, and a second terminal disposed at a position different from a position at which the first terminal is disposed and connected to the module.

5. The electronic device according to claim 1, wherein the module includes a stopper, and the battery storage includes a recess into which the stopper is inserted when the module is attached to the battery storage.

6. The electronic device according to claim 1, wherein the housing includes an indicator indicating possibility of attachment and detachment of the battery when the battery is stored in the battery storage, and the indicator is disposed on a surface of the housing that includes an input interface.

7. The electronic device according to claim 6, wherein the indicator indicates possibility of attachment and detachment of the module when the module is attached to the battery storage.

8. The electronic device according to claim 6, wherein the indicator includes an LED, and indicates the possibility of attachment and detachment by a lighting state of the LED.

9. The electronic device according to claim 1, wherein the housing includes an indicator indicating possibility of attachment and detachment of the battery when the battery is stored in the battery storage, and the indicator indicates the possibility of attachment and detachment of the battery according to a position of the lever.

* * * * *